(No Model.)
W. DEWART.
Ventilating Houses.
No. 237,831. Patented Feb. 15, 1881.
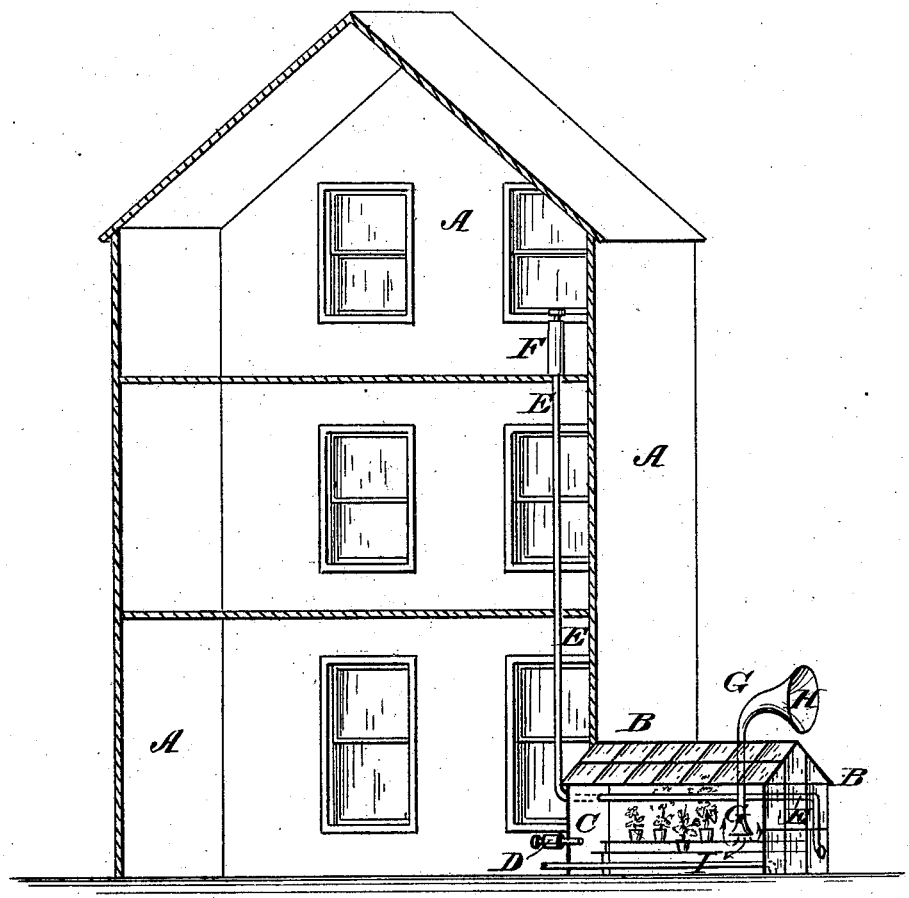
WITNESSES:
Donn P. Twitchell
C. Sedgwick
INVENTOR:
W. Dewart
BY Munn & Co
ATTORNEYS.

UNITED STATES PATENT OFFICE.

WILLIAM DEWART, OF FENELON FALLS, ONTARIO, CANADA.

VENTILATING HOUSES.

SPECIFICATION forming part of Letters Patent No. 237,831, dated February 15, 1881.

Application filed July 16, 1880. (No model.)

*To all whom it may concern:*

Be it known that I, WILLIAM DEWART, of Fenelon Falls, in the county of Victoria and Province of Ontario, Dominion of Canada, have invented a new and useful Improvement in Ventilating Houses and other Buildings, of which the following is a specification.

The drawing is a sectional elevation of the improvement.

The object of this invention is to supply houses and other buildings with purer air than the air outside of the buildings to be ventilated.

The invention consists in ventilating houses and other buildings by discharging the impure air from the house into an adjacent conservatory to be purified by the plants and introducing the purified air from the conservatory into the house; and also in the combination, with a house and an adjacent conservatory, of an outlet-pipe having a pump, an inlet-pipe having a pump, and an outside air-pipe having a bent and flared outer end, whereby the impure air is withdrawn from the house, purified by the plants, and returned with a quantity of purified outside air to the house, as will be hereinafter fully described.

A represents a house, and B is a conservatory of plants. The conservatory B should be kept filled with healthy growing plants—the more the better—from which all dead or decaying leaves and branches should be removed. The conservatory B is made long and narrow, is placed with its end toward the house A or otherwise, and is connected with said house by short pipe C, which should be connected with a pump, D, for drawing the air from the inner end of the conservatory and discharging it into the lower part of the house, whence it will find its way through all parts of the house; or pipes may be used leading to each part or room of the house, so that the air may be admitted only to the required part and as required; or a flexible hose or pipe may be used, to be taken from one part of the house to another.

E is a pipe passing down from the upper part of the house, passing into the conservatory B, and terminating at the outer end of the said conservatory, so as to withdraw the impure air from the house and discharge it into the outer part of the conservatory; or a pipe, E, may be connected with each part or room to withdraw the impure air from any desired part, as required. The pipe E should have a pump, F, connected with its upper end, so that the impure air can be forced out through it, as required.

G is a pipe passing down through the roof of the conservatory, and terminating near the floor of the said conservatory in a flaring lower end. The pipe G, a little above the roof of the conservatory, is bent at right angles, and terminates with a flaring end or mouth, H. The pipe G should be swiveled in place, so that its mouth H can be turned fully or partly toward the wind, as more or less outside air is required.

With this construction, as the air from the pipes E G passes from the outer end of the conservatory toward its inner end the plants absorb the carbonic acid and other impurities contained in it, so that it reaches the pipe C and enters the house much purer than the air outside of the building.

I represents a steam-pipe for heating the conservatory B to and keeping it at a proper temperature.

Chloride of lime or other suitable chemicals should be placed in the conservatory, to remove from the air such impurities as the plants will not absorb, and thus make the air purer.

The conservatory B is also designed to be provided with a door at its inner end opening into the house A, and a door at its outer end, which doors may also be used for controlling the circulation of air when desired.

An electric light may be used in the conservatory at night to supply the plants with light, and thus keep the circulation of their sap, and consequently their chemical action upon the air, active.

Having thus fully described my invention, I claim as new and desire to secure by Letters Patent—

1. In ventilating houses, the method of freeing the air of its impurities which consists in conducting the same from the house into a conservatory, where it is purified by the plants, and then reconducting it back into the house in its purified condition, substantially as described.

2. The combination, with a house, A, and an adjacent conservatory, of the inlet-pipe C, having pump D, the outlet-pipe E, having pump F, and the outside air-pipe, G, having bent and flared outer end, substantially as herein shown and described, whereby the impure air from the house is purified by the plants and introduced into the house purer than the outside air, as set forth.

WILLIAM DEWART.

Witnesses:
 JAS. J. POWER,
 PATRICK S. TWOMEY.